United States Patent Office 3,262,993
Patented July 26, 1966

3,262,993
GRAFT COPOLYMERS OF 2,2-DIMETHYLALKYL METHACRYLATE AND ACRYLONITRILE WITH BUTADIENE POLYMERS
Hugh J. Hagemeyer, Jr., Alden E. Blood, and Marvin B. Edwards, Longview, Tex., assignors to Eastman Kodak Company, Rochester, N.Y., a corporation of New Jersey
No Drawing. Filed Aug. 9, 1963, Ser. No. 301,195
8 Claims. (Cl. 260—879)

This invention relates to improved stability, high-impact resinous graft copolymers of monomeric acrylonitrile and 2,2-dimethylalkyl methacrylates with certain preformed butadiene polymers, and to a process for preparing the same.

Butadiene polymers are known to modify and impart valuable physical properties to materials resulting from graft copolymerizing butadiene polymers with various ethenoid monomers. While rigid and tough thermoplastic materials have resulted in some of these prior art processes, their stability, impact strengths, heat distortion temperatures, etc. have not been sufficiently high for many commercial applications.

We have now discovered that when a monomer mixture of acrylonitrile and a 2,2-dimethylalkyl methacrylate is graft copolymerized with certain butadiene polymers, in specified proportions, the resulting graft copolymers show outstanding thermal and hydrolytic stability, and shaped articles thereof are non-blooming and exhibit improved tensile strength, improved impact strength at low temperatures, improved weathering characteristics and higher heat distortion temperatures as compared with related prior art products. Accordingly, the new class of graft copolymers of the invention have expanded utility and are excellent materials, for example, for the production of high strength moldings and castings to give products such as pipe, rods, etc.

It is an object of the invention, therefore, to provide the above described new class of resinous graft copolymers and shaped articles produced therefrom of improved characteristics. Another object is to provide a process for preparing the same. Other objects will become apparent from the description and examples.

In accordance with the invention, we prepare our new class of graft copolymers by copolymerizing a mixture of (1) from 20–85% by weight, and preferably from 30–70% by weight of monomeric material consisting of from 15–80% by weight and preferably from 20–50% of acrylonitrile and from 85–20% by weight, and preferably from 80–50% of a 2,2-dimethylalkyl methacrylate represented by the general formula:

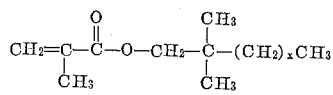

wherein $x$ represents an integer of from 1–11, e.g. 2,2-dimethylbutyl methacrylate, 2,2-dimethylpentyl methacrylate, 2,2-dimethylhexyl methacrylate, 2,2-dimethylheptyl methacrylate, 2,2-dimethyldecyl methacrylate, 2,2-dimethyldodecyl methacrylate, 2,2-dimethyltetradecyl methacrylate, etc., and (2) from 80–15% by weight and preferably from 70–30% by weight of (a) a preformed polybutadiene or (b) a copolymer of at least 90% by weight of butadiene and not more than 10% by weight of a comonomer selected from acrylonitrile, styrene and a 2,2-dimethylalkyl methacrylate coming within the above general formula, until the monomeric material has combined with the preformed butadiene polymer to form the resinous graft copolymers of the invention. Compositions outside the above specified proportions will not give the improved graft copolymers of the inventions. Advantageously, the preformed butadiene polymers are employed in the form of aqueous emulsions or latexes which may be prepared by conventional methods known to the art.

The graft copolymerizations of the invention can be carried out by any of the well-known polymerization techniques. The reactions are accelerated by heat, by actinic light, such as ultraviolet light, and by the use of known polymerization catalysts such as the peroxides, e.g. benzoyl peroxide, acetyl peroxide, lauryl peroxide, triacetone peroxide, urea peroxide, t-butyl hydroperoxide, alkyl percarbonates, etc., hydrogen peroxide, alkali metal persulfates, e.g. sodium or potassium persulfates, ammonium persulfate, alkali metal perborates and the like. Other useful polymerization catalysts are boron trifluoride and azo-bis-nitriles. Mixtures of catalysts can be employed. The quantity of catalyst employed can be varied depending on the reaction medium and other conditions, but ordinarily from about 0.01 to 2% or more, based on the weight of materials to be polymerized, is efficacious.

Advantageously, the polymerizations are carried out under an inert atmosphere, e.g. nitrogen gas, as dispersions in aqueous medium, although in mass polymerizations are also operable. Other reaction media such as organic solvents can be used. For example, hydrocarbons such as benzene, n-heptane, petroleum ether, etc., oxygenated solvents such as acetone, methanol, ethanol, isopropanol, etc. and aqueous solutions of the water-soluble solvents can be employed. The term "dispersion" is intended herein to include both true solutions and emulsions. While the ingredients can be mixed in any order, ordinarily the monomeric material, catalyst, etc. are conveniently added with stirring to the butadiene latex. The temperature of polymerization can be varied widely, for example, from about 30–100° C. or more, but preferably from 35–70° C. Atmospheric pressures are preferred, although the process is also operable at pressures substantially above or below normal atmospheric pressures. A continuous polymerization technique can be employed wherein the ingredients are added continuously at a uniform rate and the graft copolymer product is withdrawn as formed from the system in a continuous manner. Advantageously, an activating agent such as an alkali metal bisulfite or metabisulfite, e.g. sodium or potassium bisulfite, can be used in conjunction with the catalyst in approximately equal amount. Chain regulators such as hexyl, octyl, t-dodecyl mercaptans, etc. which impart improved solubility to the resulting graft copolymers can be added.

Stirring, shaking or tumbling of the polymerization reaction mixtures facilitate the polymerizations and produce more uniform products. These can be separated by conventional methods of polymer separation from their reaction mixtures, for example, by addition of saturated salt solutions such as aqueous saturated lithium chloride or sodium chloride solutions followed by filtering the precipitated graft copolymer, washing, etc. The compositions of the resulting graft copolymers have been found to be approximately of the same proportions of substituents as were present in the starting polymerization mixtures.

For preparing the emulsions and butadiene polymer latexes, suitable emulsifying agents include compounds such as salts of higher fatty acids, e.g. sodium or potassium stearate, palmitate, etc., ordinary soaps, salts of higher fatty alcohol sulfates, e.g. sodium or potassium lauryl sulfate, sodium or potassium stearyl sulfate, etc., salts of aromatic sulfonic acids such as alkylnaphthaline sulfonic acid, and the like.

The 2,2-dimethylalkyl methacrylates can be prepared by various methods, for example, by the alcoholysis process comprising an atmospheric reaction between methyl methacrylate and the 2,2-dimethylalkyl alcohols. Catalyst used is tetraisopropyl titanate. The low boiling byproduct methanol is generally removed in azeotrope form through a 15-plate column. The base material is flashed through a short head then distilled to recover the desired products. Alternate methods of preparation include:

(1) Esterification (methacrylic acid+2,2-dimethylalkanol)
(2) The acetone cyanohydrin process (acetone cyanohydrin+$H_2SO_4$+2,2-dimethylalkanol)
(3) Dehydration of an appropriate alpha hydroxy ester
(4) Dehalogenation of an appropriate alpha-halo ester The preferred alcoholysis method is illustrated by the following procedure:

PREPARATION OF 2,2-DIMETHYLBUTYL METHACRYLATE

To a 3-liter, 3-neck flask equipped with a thermowell was added 400 g. (4 moles) methyl methacrylate, 816 gm. (8 moles) 2,2-dimethylbutanol, 1 gm. hydroquinone and 6.08 gm. TPT (tetraisopropyl titanate). The catalyst went into solution forming a deep orange color. Refluxed under a 15-plate glass column at atmospheric pressure to recover a methanol-methyl methacrylate azeotrope. Flashed the reaction mixture on a short head to get the products away from catalyst. Distilled to recover 2,2-dimethylbutyl methacrylate (460.1 g.=83.9% of theory). The product boiled at 59.5° C./5 mm. The index of refraction was 1.4286 (25° C./D). The specific gravity (20° C./20° C.) was 0.8878 and the freezing point was −60° C. Although methyl methacrylate is the preferred intermediate in the above procedure, it will be understood that any other lower alkyl methacrylate can also be employed, for example, ethyl, propyl, isopropyl, butyl, etc. methacrylates to give generally similar results. Also, the above procedure gives other of the mentioned 2,2-dimethylalkyl methacrylates of the invention by selection of the appropriate 2,2-dimethylalkanol. Thus, substitution of 2,2-dimethylhexanol in the above procedure gave 2,2-dimethylhexyl methacrylate, B.P. 100° C./12.5 mm., specific gravity 0.8811 (20° C./20° C.), index of refraction 1.4340 (25° C./D), and freezing point −58° C.; substitution of 2,2-dimethyloctanol in the above procedure gave 2,2-dimethyloctyl methacrylate, B.P. 94° C./2.5 mm., specific gravity 0.8313 (20° C./20° C.), index of refraction 1.4379 (25° C./D), and freezing point −60° C.; substitution of 2,2-dimethyldodecanol in the above procedure gave 2,2-dimethyldodecyl methacrylate, B.P. 138–143° C./2.5 mm., specific gravity 0.8722 (20° C./20° C.), index of refraction 1.4455 (25° C./D), and freezing point −45° C.; and substitution of 2,2-dimethyltetradecanol in the above procedure gave 2,2-dimethyltetradecyl methacrylate, B.P. 162° C./2.5 mm., specific gravity 0.8668 (20° C./20° C.), index of refraction 1.4504 (25° C./D), and freezing point −33° C.

The following examples will serve to illustrate further the manner of practicing our invention.

Example 1

A polybutadiene latex was prepared by heating at 60° C. for four hours a butadiene emulsion containing 2 percent of Duponol ME (a fatty alcohol sulfate) and 0.2 percent sodium persulfate. The resulting polybutadiene latex contained 50 percent solids.

A mixture consisting of 100 g. of the above polybutadiene latex, 200 ml. of water, 0.5 g. of sodium persulfate, 0.2 g. of t-dodecylmercaptan, 70 g. of inhibitor-free 2,2-dimethylbutyl methacrylate, and 30 g. of inhibitor-free acrylonitrile was heated under nitrogen at 50° C. for six hours with agitation. The resulting latex was coagulated with saturated lithium chloride solution and the precipitated polymer was water and methanol washed. The polymer was dried first in air at ambient temperature and then at 50° C. Analysis showed it to be a graft copolymer of approximately 33% by weight of butadiene units, 20% by weight of acrylonitrile units and 47% by weight of 2,2-dimethylbutyl methacrylate units. The dried polymer was crushed and molded into test button samples. These were found to be very stable to boiling water and alkaline solutions. The physical properties of the polymer as determined from the test samples are shown in Example 3.

Example 2

A polybutadiene-polystyrene latex, the polymer containing 10 percent styrene, was prepared in the same way as the polybutadiene latex was prepared in Example 1. The latex contained 58 percent solids. A mixture of 100 g. of the butadiene-styrene latex, 200 ml. of water, 0.5 g. of sodium persulfate, 0.5 g. of t-dodecylmercaptan, 60 g. of inhibitor-free 2,2-dimethylbutyl methacrylate, and 40 g. of inhibitor-free acrylonitrile was heated under nitrogen at 50° C. for six hours with agitation. The resulting latex was precipitated with a saturated lithium chloride solution. The precipitated polymer was washed with water and methanol and then dried at 60° C. Analysis for nitrogen indicated that a graft copolymer had been obtained that contained approximately 25% by weight of acrylonitrile units. Sample buttons were prepared by the procedure of Example 1. Tests thereon indicated that the polymer had high thermal and hydrolytic stability. The physical properties are given in Example 3.

Example 3

Table I below shows the physical properties of the graft copolymers of Examples 1 and 2.

TABLE I.—PHYSICAL PROPERTIES

| Property | Polymer From— | |
| --- | --- | --- |
| | Example 1 | Example 2 |
| Impact Strength: [a] | | |
| 25° C | 12 | 10 |
| −20° C | 9 | 7 |
| Tensile Strength, p.s.i | 8,860 | 7,230 |
| Rockwell Hardness, R Scale | 110 | 120 |
| Heat Distortion Temp. (° C.) | 154 | 130 |

[a] Izod Test, ft.-lb. per inch of notch.

By comparison of the above results with currently available commercial impact resins, it will be noted that the graft copolymers produced in accordance with the invention are outstanding. For example, commercial resins of this type generally have impact strengths at 250° C. of only from 6 to 8 ft.-lb. and at −20° C. they are generally very low, i.e. on the order of from 0.3 to 0.8 ft.-lb. In contrast, the compositions of Examples 1 and 2 of the invention show superior impact at 25° C. and very high impact strength at −20° C. compared to the usual commercial products presently available. In the same manner, the compositions of Examples 1 and 2 show superior tensile strengths of from 7000–8000 p.s.i. compared to only 2500–4000 p.s.i. for the usual impact resin. Hardness of commercial impact resins is about 80–100 on the R scale (Rockwell hardness), while the compositions of Examples 1 and 2 show hardness of 110–120 on the R scale. The heat distortion temperature of the commercial impact resins vary from 80–110° C. as compared to 130–145° C. for the compositions of Examples 1 and 2 of the invention. These results together with the high thermal and hydrolytic stability indicate that the graft copolymers of the invention are in fact outstanding as compared with related resinous graft copolymers.

By following the procedures described in the above examples, other related graft copolymers may be prepared from any other of the mentioned 2,2-dimethylalkyl methacrylates in combination with acrylonitrile. Also, it will be understood that the 2,2-dimethylbutyl methacrylate specified in above Examples 1 and 2 can be substituted by an equivalent amount of any other of the mentioned 2,2-dimethylalkyl methacrylates, for example, by 2,2 - dimethylhexyl methacrylate, 2,2 - dimethyloctyl methacrylate, 2,2 - dimethyldecyl methacrylate, 2,2 - dimethyldodecyl methacrylate, or 2,2 - dimethtetradecyl methacrylate to give the corresponding graft copolymers of generally similar properties.

All of the graft copolymers of the invention can readily be milled with or without added fillers, pigments, dyes, plasticizers, flow improvers, etc., and most can be blended with other plastic materials compatible therewith such as polystyrene, polypropylene, polyvinyl chloride, acrylonitrile polymers such as butadienestyrene copolymers, butadieneacrylonitrile copolymers, and the like, and converted to shaped articles such as sheets, rods, pipes, and the like, of outstanding stability and strength as set forth previously, by the usual compression, injection or extrusion techniques.

This invention has been described in detail with particular reference to certain preferred embodiments thereof, but it will be understood that variations and modifications can be effected within the spirit and scope of the invention as described hereinabove and as defined in the appended claims.

What we claim is:
1. A resinous graft copolymer of (1) from 20–85% by weight of monomeric material consisting of from 15–80% by weight of acrylonitrile and from 85–20% by weight of at least one 2,2-dimethylalkyl methacrylate having the general formula:

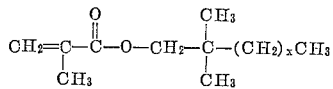

wherein $x$ represents an integer of from 1–11, and (2) from 80–15% by weight of a preformed polymer selected from the group consisting of (a) polybutadiene and (b) a copolymer of at least 90% by weight of butadiene and not more than 10% by weight of a compound selected from the group consisting of acrylonitrile, styrene and a 2,2-dimethyl methacrylate represented by the said general formula.

2. A resinous graft copolymer of (1) from 20–85% by weight of monomeric material consisting of from 15–80% by weight of acrylonitrile and from 85–20% by weight of a 2,2-dimethylalkyl methacrylate having the general formula:

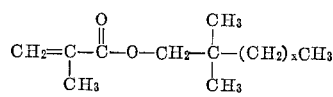

wherein $x$ represents an integer of from 1–11, and (2) from 80–15% by weight of polybutadiene.

3. A resinous graft copolymer of (1) from 20–85% by weight of monomeric material consisting of from 15–80% by weight of acrylonitrile and from 85–20% by weight of a 2,2-dimethylalkyl methacrylate having the general formula:

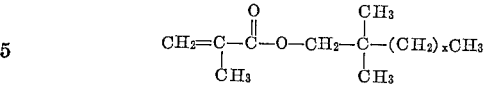

wherein $x$ represents an integer of from 1–11, and (2) from 80–15% by weight of a copolymer of at least 90% by weight of butadiene and not more than 10% by weight of a compound selected from the group consisting of acrylonitrile, styrene and a 2,2-dimethylalkyl methacrylate represented by said general formula.

4. A resinous graft copolymer of (1) from 30–70% by weight of monomeric material consisting of from 20–50% by weight of acrylonitrile and from 80–50% by weight 2,2-dimethylbutyl methacrylate, and (2) from 70–30% by weight of polybutadiene.

5. A resinous graft copolymer of (1) from 30–70% by weight of monomeric material consisting of from 20—50% by weight of acrylonitrile and from 80–50% by weight of 2,2-dimethyl methacrylate, and (2) from 70–30% by weight of a copolymer of at least 90% by weight of butadiene and not more than 10% by weight of styrene.

6. A resinous graft copolymer of (1) from 30–70% by weight of monomeric material consisting of from 20–50% by weight of acrylonitrile and from 80–50% by weight of 2,2-dimethylbutyl methacrylate, and (2) from 70–30% by weight of a copolymer of at least 90% of butadiene and not more than 10% by weight of acrylonitrile.

7. A resinous graft copolymer of (1) from 30–70% by weight of monomeric material consisting of from 20–50% by weight of acrylonitrile and from 80–50% by weight of 2,2-dimethylbutyl methacrylate, and (2) from 70–30% by weight of a copolymer of at least 90% by weight of butadiene and not more than 10% by weight of 2,2-dimethylbutyl methacrylate.

8. A process for preparing a resinous graft copolymer which comprises heating in the presence of a polymerization catalyst an aqueous mixture comprising (1) from 20–85% by weight of monomeric material consisting of from 15–80% by weight of acrylonitrile and from 85–20% by weight of at least one 2,2-dimethylalkyl methacrylate having the general formula:

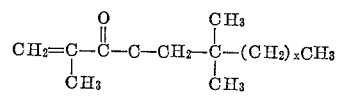

wherein $x$ represents an integer of from 1–11, and (2) from 80–15% by weight of a preformed polymer selected from the group consisting of (a) polybutadiene and (b) a copolymer of at least 90% by weight of butadiene and not more than 10% by weight of a compound selected from the group consisting of acrylonitrile, styrene and a 2,2-dimethyl methacrylate represented by the said general formula, until the said monomeric material has combined with the said preformed copolymer to form the said graft copolymer.

No references cited.

SAMUEL H. BLECH, *Primary Examiner.*

C. F. LEMES, *Assistant Examiner.*